US011435457B2

(12) United States Patent
Yoshino et al.

(10) Patent No.: US 11,435,457 B2
(45) Date of Patent: Sep. 6, 2022

(54) SURVEYING INSTRUMENT

(71) Applicant: TOPCON Corporation, Tokyo-to (JP)

(72) Inventors: Ken-ichiro Yoshino, Tokyo-to (JP); Taizo Eno, Tokyo-to (JP); Hideki Morita, Tokyo-to (JP); Kohei Fujita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 684 days.

(21) Appl. No.: 16/524,330

(22) Filed: Jul. 29, 2019

(65) Prior Publication Data

US 2020/0041626 A1    Feb. 6, 2020

(30) Foreign Application Priority Data

Aug. 3, 2018    (JP) .............................. JP2018-146747

(51) Int. Cl.
     *G01S 7/499*      (2006.01)
     *G01S 7/48*      (2006.01)
     *G01S 17/42*      (2006.01)
     *G01S 7/481*      (2006.01)

(52) U.S. Cl.
     CPC ............ *G01S 7/499* (2013.01); *G01S 7/4802* (2013.01); *G01S 7/4817* (2013.01); *G01S 17/42* (2013.01)

(58) Field of Classification Search
     CPC ........ G01C 3/00; G01C 15/002; G01N 21/21; G01N 2201/105; G01N 2201/1793; G01B 11/24; G01S 7/4802; G01S 7/4817; G01S 7/499; G01S 17/42

USPC .......................................................... 702/158
See application file for complete search history.

(56) References Cited

U.S. PATENT DOCUMENTS

| | | | |
|---|---|---|---|
| 6,420,698 B1 | 7/2002 | Dimsdale | |
| 2004/0207832 A1 | 10/2004 | Ohtomo et al. | |
| 2019/0078883 A1* | 3/2019 | Yuasa | ...................... G01C 1/04 |
| 2019/0154805 A1* | 5/2019 | Ohtomo | ................ G01S 7/4817 |
| 2019/0360806 A1* | 11/2019 | Ohtomo | ................ G01S 7/4808 |

OTHER PUBLICATIONS

European communication dated Jan. 7, 2020 in corresponding European patent application No. 19189273.6.

* cited by examiner

*Primary Examiner* — John H Le
(74) *Attorney, Agent, or Firm* — Nields, Lemack & Frame, LLC

(57) ABSTRACT

A surveying instrument comprises a projection optical system for irradiating a distance measuring light which is a linearly-polarized light to an object to be measured, a light receiving optical system for receiving a reflected distance measuring light from the object to be measured, a polarization selecting module for selecting a polarization of the reflected distance measuring light received by the light receiving optical system and an arithmetic control module for controlling a distance measurement based on a light receiving result of the reflected distance measuring light, wherein the arithmetic control module is configured to give a material information to a distance measurement result of the object to be measured based on a change in light receiving amounts caused due to a selection of the polarization by the polarization selecting module.

11 Claims, 8 Drawing Sheets

SURVEYING INSTRUMENT

BACKGROUND OF THE INVENTION

The present invention relates to a surveying instrument which enables to acquire point cloud data of an object to be measured.

As a surveying instrument, there is a total station or a three-dimensional laser scanner. The total station is used in case of measuring a point to be measured. The three-dimensional laser scanner obtains a shape of an object to be measured as a set of an infinite number of points having three-dimensional coordinates, that is, three-dimensional point cloud data.

Recently, there has been used a software which automatically detect data of a pipe or a structural steel included in point cloud data from a shape based on the point cloud data acquired by a three-dimensional laser scanner. The software mainly replaces CAD data of components of which size is set based on the industrial standards with the point cloud data, reduces a data amount, facilitates a comparison with design CAD data and improves a work efficiency.

For instance, in order to extract the pipe from a shape of the acquired point cloud data and match the pipe fitting with a size of the pipe with a point cloud, it is necessary to determine whether or not a point cloud shape is a cylindrical shape with respect to all of the point cloud data. Therefore, the processings take time, and a problem of a poor work efficiency arises.

SUMMARY OF THE INVENTION

It is an object of the present invention to provide a surveying instrument which enables to reduce a time taken to extract a corresponding object from acquired point cloud data.

To attain the object as described above, a surveying instrument according to the present invention comprises a projection optical system for irradiating a distance measuring light which is a linearly-polarized light to an object to be measured, a light receiving optical system for receiving a reflected distance measuring light from the object to be measured, a polarization selecting module for selecting a polarization of the reflected distance measuring light received by the light receiving optical system, a frame unit which horizontally rotates around a horizontal rotation shaft by a horizontal rotation motor, a scanning mirror which is provided in the frame unit, vertically rotates around a vertical rotation shaft by a vertical rotation motor, irradiates the distance measuring light from the projection optical system to the object to be measured and makes the reflected distance measuring light from the object to be measured enter the light receiving optical system, a horizontal angle detecting module for detecting a horizontal angle of the frame unit, a vertical angle detecting module for detecting a vertical angle of the scanning mirror and an arithmetic control module for controlling a distance measurement, a rotation of the frame unit and a rotation of the scanning mirror based on a light receiving result of the reflected distance measuring light, wherein the arithmetic control module is configured to give a material information to a distance measurement result of the object to be measured based on a change in light receiving amounts caused due to a selection of the polarization by the polarization selecting module.

Further, in the surveying instrument according to a preferred embodiment, the polarization selecting module is a polarizing beam splitter for dividing the reflected distance measuring light into a P-polarized light and an S-polarized light, the light receiving optical system comprises a first photodetector provided on a transmission optical axis of the polarizing beam splitter and a second photodetector provided on a reflection optical axis of the polarizing beam splitter, and the arithmetic control module compares a light receiving amount detected by the first photodetector with a light receiving amount detected by the second photodetector.

Further, the surveying instrument according to a preferred embodiment further comprises a quarter-wave plate provided on a common optical path of the distance measuring light and the reflected distance measuring light.

Further, the surveying instrument according to a preferred embodiment further comprises quarter-wave plates provided on an optical axis of the distance measuring light and an optical axis of the reflected distance measuring light, respectively.

Further, in the surveying instrument according to a preferred embodiment, the polarization selecting module is constituted of a polarizing plate insertably and removably provided on an optical axis of the reflected distance measuring light and a polarizing plate driving module which inserts and removes the polarizing plate, and the arithmetic control module compares a light receiving amount of the reflected distance measuring light transmitted through the polarizing plate and received by the light receiving optical system with a light receiving amount of the reflected distance measuring light received by the light receiving optical system without being transmitted through the polarizing plate.

Further, in the surveying instrument according to a preferred embodiment, the polarization selecting module is a polarizing beam splitter for dividing the distance measuring light into a P-polarized light and an S-polarized light, the projection optical system is constituted of a first light source module, which is provided on a transmission optical axis of the polarizing beam splitter and projects the distance measuring light which is the linearly-polarized light, a second light source module, which is provided on a reflection optical axis of the polarizing beam splitter and projects a distance measuring light which is a linearly-polarized light orthogonal to the linearly-polarized light and a polarizing plate provided on an optical axis of the reflected distance measuring light, and the arithmetic control module makes the first light source module and the second light source module project the distance measuring lights and compares light receiving amounts of each of the distance measuring lights detected by the light receiving optical system.

Further, in the surveying instrument according to a preferred embodiment, the polarization selecting module is constituted of a half-wave plate insertably and removably provided on an optical axis of the distance measuring light, a wave plate driving module which inserts and removes the half-wave plate and a polarizing plate provided on an optical axis of the reflected distance measuring light, and the arithmetic control module compares a light receiving amount of the reflected distance measuring light transmitted through the half-wave plate and received by the light receiving optical system with a light receiving amount of the reflected distance measuring light received by the light receiving optical system without being transmitted through the half-wave plate.

Further, in the surveying instrument according to a preferred embodiment, the polarizing plate has optical characteristics through which transmit only a linearly-polarized light which is equal to the distance measuring light.

Furthermore, in the surveying instrument according to a preferred embodiment, the polarizing plate has optical characteristics through which transmit only a linearly-polarized light which is orthogonal to the distance measuring light.

According to the present invention, the surveying instrument comprises a projection optical system for irradiating a distance measuring light which is a linearly-polarized light to an object to be measured, a light receiving optical system for receiving a reflected distance measuring light from the object to be measured, a polarization selecting module for selecting a polarization of the reflected distance measuring light received by the light receiving optical system, a frame unit which horizontally rotates around a horizontal rotation shaft by a horizontal rotation motor, a scanning mirror which is provided in the frame unit, vertically rotates around a vertical rotation shaft by a vertical rotation motor, irradiates the distance measuring light from the projection optical system to the object to be measured and makes the reflected distance measuring light from the object to be measured enter the light receiving optical system, a horizontal angle detecting module for detecting a horizontal angle of the frame unit, a vertical angle detecting module for detecting a vertical angle of the scanning mirror and an arithmetic control module for controlling a distance measurement, a rotation of the frame unit and a rotation of the scanning mirror based on a light receiving result of the reflected distance measuring light, wherein the arithmetic control module is configured to give a material information to a distance measurement result of the object to be measured based on a change in light receiving amounts caused due to a selection of the polarization by the polarization selecting module. As a result, determining whether or not a point cloud shape is a cylindrical shape only regarding a point cloud determined to be made of a metal can suffice at the time of extracting a metal component such as a pipe or the like from the point cloud data, which results in achieving a reduction in a processing time and an improvement in a work efficiency.

DETAILED DESCRIPTION OF THE PREFERRED EMBODIMENTS

Figure 1:
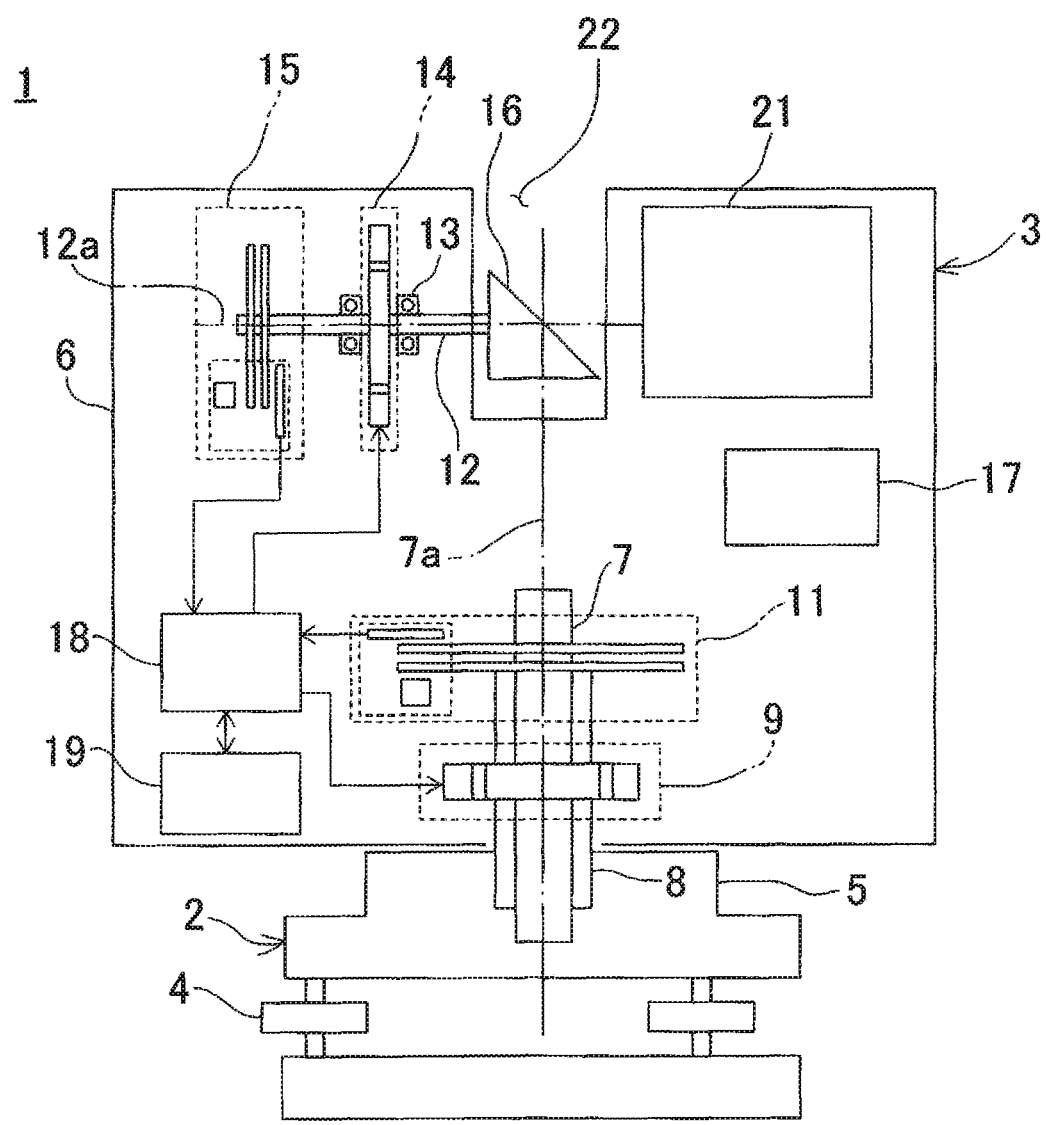
FIG. 1 is a front cross-sectional view to show a surveying instrument according to a first embodiment.

A description will be given below on embodiments of the present invention by referring to the attached drawings.

First, in FIG. 1, a description will be given on a surveying instrument according to a first embodiment of the present invention.

A surveying instrument 1 has a leveling module 2 attached on a tripod (not shown) and a surveying instrument main body 3 provided on the leveling module 2.

The leveling module 2 has leveling screws 4, and the surveying instrument main body 3 is leveled by the leveling screws 4.

The surveying instrument main body 3 comprises a fixed portion 5, a frame unit 6, a horizontal rotation shaft 7, a horizontal rotation bearing 8, a horizontal rotation motor 9 as a horizontal rotary driving module, a horizontal angle encoder 11 as a horizontal angle detecting module, a vertical rotation shaft 12, a vertical rotation bearing 13, a vertical rotation motor 14 as a vertical rotary driving module, a vertical angle encoder 15 as a vertical angle detecting module, a scanning mirror 16 as a vertical rotation member, an operation panel 17 which functions as both an operation module and a display module, an arithmetic control module 18, a storage module 19, a distance measuring module 21 configured as an electronic distance meter (EDM) and others.

The horizontal rotation bearing 8 is fixed to the fixed portion 5. The horizontal rotation shaft 7 has a vertical axis 7a, and the horizontal rotation shaft 7 is rotatably supported by the horizontal rotation bearing 8. Further, the frame unit 6 is supported by the horizontal rotation shaft 7, and the frame unit 6 is integrally rotated with the horizontal rotation shaft 7 in a horizontal direction.

The horizontal rotation motor 9 is provided between the horizontal rotation bearing 8 and the frame unit 6, and the horizontal rotation motor 9 is controlled by the arithmetic control module 18. The arithmetic control module 18 rotates the frame unit 6 around the axis 7a by the horizontal rotation motor 9.

A relative rotation angle of the frame unit 6 with respect to the fixed portion 5 is detected by the horizontal angle encoder 11. A detection signal from the horizontal angle encoder 11 is input to the arithmetic control module 18, and horizontal angle data is calculated by the arithmetic control module 18. The arithmetic control module 18 executes a feedback control with respect to the horizontal rotation motor 9 based on the horizontal angle data.

Further, in the frame unit 6, the vertical rotation shaft 12 having a horizontal axis 12a is provided. The vertical rotation shaft 12 is rotatable via the vertical rotation bearing 13. It is to be noted that an intersection of the axis 7a and the axis 12a is a projecting position of a distance measuring light and an origin of a coordinate system of the surveying instrument main body 3.

In the frame unit 6, a recessed part 22 is formed. One end portion of the vertical rotation shaft 12 is extended in the recessed part 22. The scanning mirror 16 is fixed to the one end portion, and the scanning mirror 16 is accommodated in the recessed part 22. Further, at the other end portion of the vertical rotation shaft 12, the vertical angle encoder 15 is provided.

The vertical rotation motor 14 is provided on the vertical rotation shaft 12, and the vertical rotation motor 14 is controlled by the arithmetic control module 18. The arithmetic control module 18 rotates the vertical rotation shaft 12 by the vertical rotation motor 14, and the scanning mirror 16 is rotated around the axis 12a.

A rotation angle of the scanning mirror 16 is detected by the vertical angle encoder 15, and a detection signal is input to the arithmetic control module 18. The arithmetic control module 18 calculates vertical angle data of the scanning mirror 16 based on the detection signal and executes a feedback control with respect to the vertical rotation motor 14 based on the vertical angle data.

Further, as the arithmetic control module 18, a general-purpose CPU or a CPU specialized for this instrument is used. The horizontal angle data and the vertical angle data calculated by the arithmetic control module 18, a distance measurement result, a light receiving amount information (to be described later) and a material information (to be described later) are stored in the storage module 19. A part of the storage module 19 which stores the horizontal angle data, the vertical angle data, a distance measurement result, the light receiving amount information and the material information may be attachable and detachable to and from the frame unit 6, or the data can be transmitted to an external storage device or an external data processing device via a communicating means (not shown).

Further, as the storage module 19, an HDD, a memory card, a semiconductor memory or the like is used. In the storage module 19 are stored programs such as a program configured to perform a distance measurement and an angle measurement of a measuring point, a program configured to drive the horizontal rotation motor 9 and the vertical rotation motor 14, a program configured to detect light receiving amounts of a P-polarized light and an S-polarized light (to be described later) respectively, a program configured to determine whether the object to be measured is made of a metal or a non-metal based on each of the light receiving amounts (to be described later) and other programs. The arithmetic control module 18 executes various kinds of processings according to the embodiments of the present invention based on each program stored in the storage module 19.

The operation panel 17 is, for instance, a touch panel and functions as both an operation module for executing an instruction of the distance measurement, changing a measurement condition, for instance, a measuring point interval and the like and a display module for displaying the distance measurement result, the material information and the like.

Figure 2A:
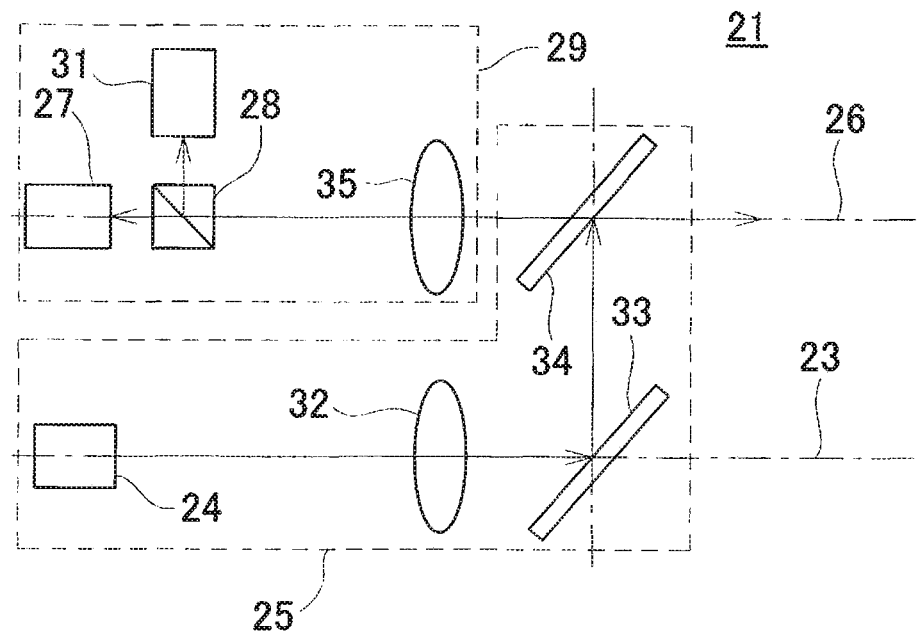
FIG. 2A is a schematical block diagram to show an optical system of a distance measuring module according to the first embodiment.

A description will be given on the distance measuring module 21 in FIG. 2A.

The distance measuring module 21 has a projection optical system 25 and a light receiving optical system 29. The projection optical system 25 has a light source module 24, a projecting lens 32 and a mirror 33 which are provided on a projection optical axis 23, and a beam splitter 34 which is provided on a reflection optical axis of the mirror 33.

Further, the light receiving optical system 29 has a first photodetector 27, a photodetection polarizing beam splitter 28 as a polarization selecting module and a photodetecting lens 35 which are provided on a light receiving optical axis 26, and a second photodetector 31 which is provided on a reflection optical axis of the photodetection polarizing beam splitter 28.

It is to be noted that the beam splitter 34 is provided at a crossing position of the projection optical axis 23 and the light receiving optical axis 26. Further, the light receiving optical axis 26 coincides with a transmission optical axis of the photodetection polarizing beam splitter 28.

The light source module 24 is a light emitter such as a laser diode (LD) or the like and pulse-emits or burst-emits (intermittently emits) a laser beam which is a predetermined linear polarized light, for instance, a P-polarized laser beam, as the distance measuring light onto the projection optical axis 23.

The mirror 33 deflects the distance measuring light at a right angle. Further, the beam splitter 34 has optical characteristics which reflect a part of the distance measuring light and through which transmit a part of a reflected distance measuring light reflected by an object to be measured. Further, the beam splitter 34 deflects the distance measuring light onto the light receiving optical axis 26.

The photodetection polarizing beam splitter 28 has optical characteristics through which transmit a light which is a P-polarized light and which reflect a light which is an S-polarized light in the reflected distance measuring light.

The first photodetector 27 is a photodetector such as an avalanche photodiode (APD) or the like and detects a light amount of the reflected distance measuring light, which is the P-polarized light transmitted through the photodetection polarizing beam splitter 28. Further, the second photodetector 31 is a photodetector such as an APD or the like and detects a light amount of the reflected distance measuring light, which is the S-polarized light reflected by the photodetection polarizing beam splitter 28. The light amounts detected by the first photodetector 27 and the second photodetector 31 are stored in the storage module 19, respectively. It is to be noted that an optical path length between the first photodetector 27 and the photodetection polarizing beam splitter 28 coincides with an optical path length between the second photodetector 31 and the photodetection polarizing beam splitter 28.

A description will be given on a case where the distance measurement is performed by the surveying instrument 1.

The distance measuring light, which is the pulsed light or the burst-emitted light as the P-polarized light, is emitted from the light source module 24. The distance measuring light is transmitted through the projecting lens 32 and then sequentially reflected by the mirror 33 and the beam splitter 34. The distance measuring light reflected by the beam splitter 34 enters the scanning mirror 16.

An optical axis of the distance measuring light which enters the scanning mirror 16 coincides with the axis 12a, and the distance measuring light is deflected at a right angle by the scanning mirror 16. When the scanning mirror 16 rotates around the axis 12a, the distance measuring light becomes orthogonal to the axis 12a and is rotated (scanned) within a plane including the axis 7a. The distance measuring light reflected by the scanning mirror 16 is irradiated to a predetermined measuring point (irradiation point) of the object to be measured, and the object to be measured is scanned.

The reflected distance measuring light reflected on the measuring point enters the scanning mirror 16 and is reflected at a right angle by the scanning mirror 16. The reflected distance measuring light reflected by the scanning mirror 16 is transmitted through the beam splitter 34 and the photodetecting lens 35 and enters the photodetection polarizing beam splitter 28. In the reflected distance measuring light which enters the photodetection polarizing beam splitter 28, the P-polarized light is transmitted through the photodetection polarizing beam splitter 28 and received by the first photodetector 27. In the reflected distance measuring light which enters the photodetection polarizing beam splitter 28, the S-polarized light is reflected by the photodetection polarizing beam splitter 28 and received by the second photodetector 31.

Figure 2B:
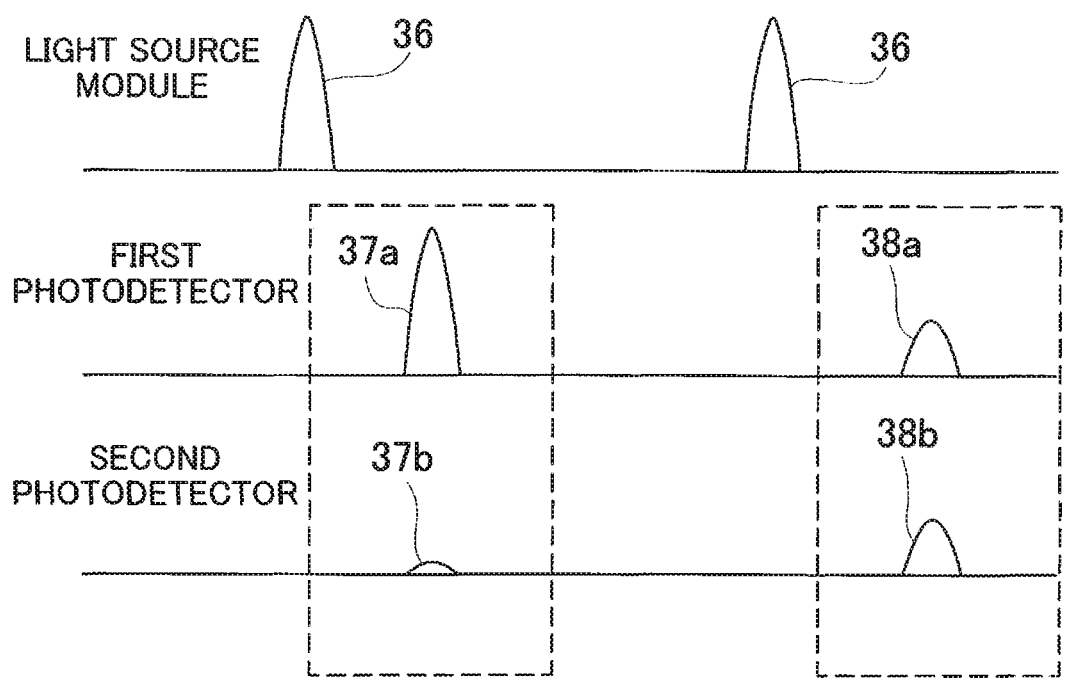
FIG. 2B is an explanatory drawing to explain a relationship between light amounts of a light source module and photodetectors.

FIG. 2B is a graph to show a relationship between a projection light amount 36 of the distance measuring light projected from the light source module 24, light receiving amounts 37a and 38a of the reflected distance measuring light, which is the P-polarized light received by the first photodetector 27, and the light receiving amounts 37b and 38b of the reflected distance measuring light, which is the S-polarized light received by the second photodetector 31.

It is to be noted that, in FIG. 2B, an axis of abscissa represents a time, and a size of a waveform represents a degree of the light amounts. Further, in FIG. 2B, reference signs 37a and 37b denote the light receiving amounts of the first photodetector 27 and the second photodetector 31 in a case where the object to be measured is made of a metal, respectively. Further, in FIG. 2B, reference signs 38a and 38b denote the light receiving amounts of the first photodetector 27 and the second photodetector 31 in a case where the object to be measured is made of a non-metal. Further, in FIG. 2B, a sum total of the light receiving amounts of the first photodetector 27 and the second photodetector 31 in a case where the object to be measured is made of a metal is equal to the light receiving amounts of the first photodetector 27 and the second photodetector 31 in a case where the object to be measured is made of a non-metal, for convenience sake.

Here, it is known that, in a case where the object to be measured is made of a metal, that is, in a case where the object to be measured has a conduction, the distance measuring light is reflected in a state where the polarization characteristics are kept. For this reason, in a case where the distance measuring light which is the P-polarized light is projected with respect to the object to be measured made of a metal, as shown in FIG. 2B, the light receiving amount 37a of the first photodetector 27 and the light receiving amount 37b of the second photodetector 31 are detected in such a manner that the light receiving amount 37a is higher than the light receiving amount 37b.

On the other hand, it is known that, in a case where the object to be measured is made of a non-metal, that is, in a case where the object to be measured has no conduction, the reflected distance measuring light is reflected without keeping the polarization characteristics. For this reason, in a case where the distance measuring light which is the P-polarized light is projected with respect to the object to be measured made of a non-metal, both the P-polarized light and the S-polarized light coexist in the reflected distance measuring light from the object to be measured. Therefore, as shown in FIG. 2B, the light receiving amount 38a of the first photodetector 27 and the light receiving amount 38b of the second photodetector 31 are detected substantially equivalently to each other.

Therefore, by comparing the light amounts of the P-polarized light and the S-polarized light in the distance measuring light with the light amounts of the P-polarized light and the S-polarized light in the reflected distance measuring light, the arithmetic control module 18 can determine whether the object to be measured is made of a metal or a non-metal. Alternatively, by comparing a light receiving result of the first photodetector 27 with a light receiving result of the second photodetector 31, the arithmetic control module 18 can determine whether the object to be measured is made of a metal or a non-metal.

The arithmetic control module 18 performs the distance measurement for each one pulse of the distance measuring light (Time of Flight) based on a time difference between a light emission timing of the light source module 24 and photodetection timings of the reflected distance measuring light of the first photodetector 27 and the second photodetector 31 (that is, a round-trip time of the pulsed light) and a light velocity. Further, the arithmetic control module 18 can change the light emission timing of the light source module 24, that is, a pulse interval.

Further, the arithmetic control module 18 determine whether the object to be measured, on which the measuring points exist, is made of a metal or a non-metal based on the light receiving results of the first photodetector 27 and the second photodetector 31. It is to be noted that, as a photodetection signal in case of performing the distance measurement, a sum of a photodetection signal from the first photodetection module 27 and a photodetection signal from the second photodetection module 31 is used. When the sum of the photodetection signals of the first photodetector 27 and the second photodetector 31 is used, a reduction in the light receiving amount of a case where the P-polarized light and the S-polarized light are divided can be avoided. Distance measurement data acquired in the distance measurement and determination data regarding whether the object to be measured is made of a metal or a non-metal (material information) are associated with each other for each measuring point and stored in the storage module 19.

Further, the frame unit 6 and the scanning mirror 16 rotate at a constant speed respectively, and by a cooperation between a rotation of the scanning mirror 16 in the vertical direction and a rotation of the frame unit 6 in the horizontal direction, the distance measuring light is two-dimensionally scanned. Further, the distance measurement data (slope distance) is acquired by the distance measurement for each pulsed light, and by detecting a vertical angle and a horizontal angle by the vertical angle encoder 15 and the horizontal angle encoder 11 for each pulsed light, the vertical angle data and the horizontal angle data can be acquired. Three-dimensional point cloud data (positional information) of the object to be measured in which the material information is given for each point can be acquired based on the vertical angle data, the horizontal angle data, the distance data and the determination data.

As described above, in the first embodiment, the photodetection polarizing beam splitter 28 is provided on the light receiving optical axis 26 in such a manner that the light amount of the P-polarized light and the light amount of the S-polarized light in the reflected distance measuring light can be detected respectively. As a result, whether the object to be measured is made of a metal or a non-metal can be determined based on a ratio of the P-polarized light and the S-polarized light in the distance measuring light and a ratio of the P-polarized light and the S-polarized light in the reflected distance measuring light.

Therefore, at the time of extracting a pipe, for instance, from the point cloud data, since determining whether or not a point cloud shape is a cylindrical shape only regarding a point cloud determined to be a metal can suffice, a processing time can be reduced, and a work efficiency can be improved.

Further, since just providing the photodetection polarizing beam splitter 28 and the second photodetector 31 to the conventional distance measuring module 21 can suffice, it is not necessary to add a large-scale device. Therefore, a function to determine a material of the object to be measured can be added without increasing a size of the surveying instrument 1.

Figure 3A:
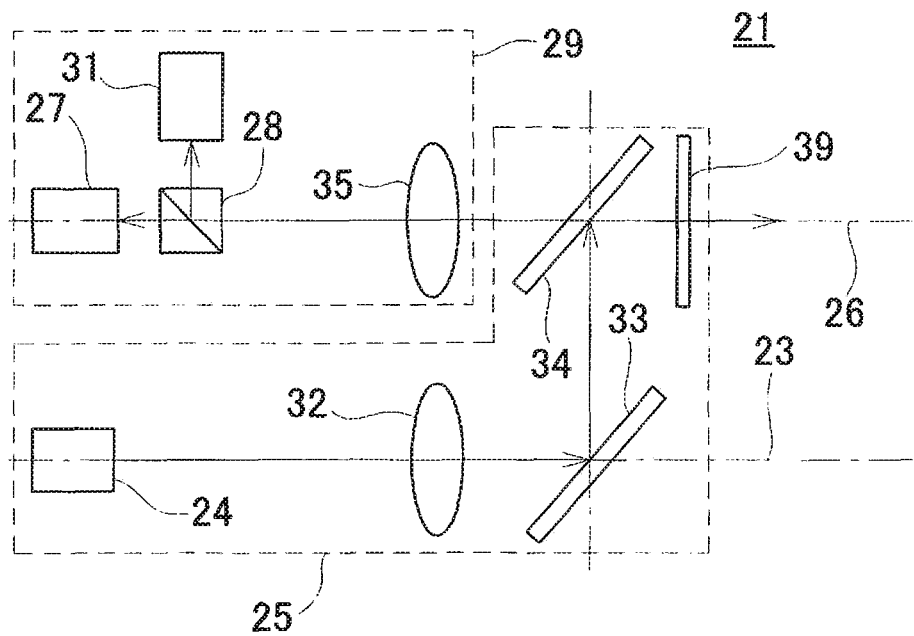
FIG. 3A is a schematical block diagram to show an optical system of a distance measuring module according to a second embodiment.
Figure 3B:
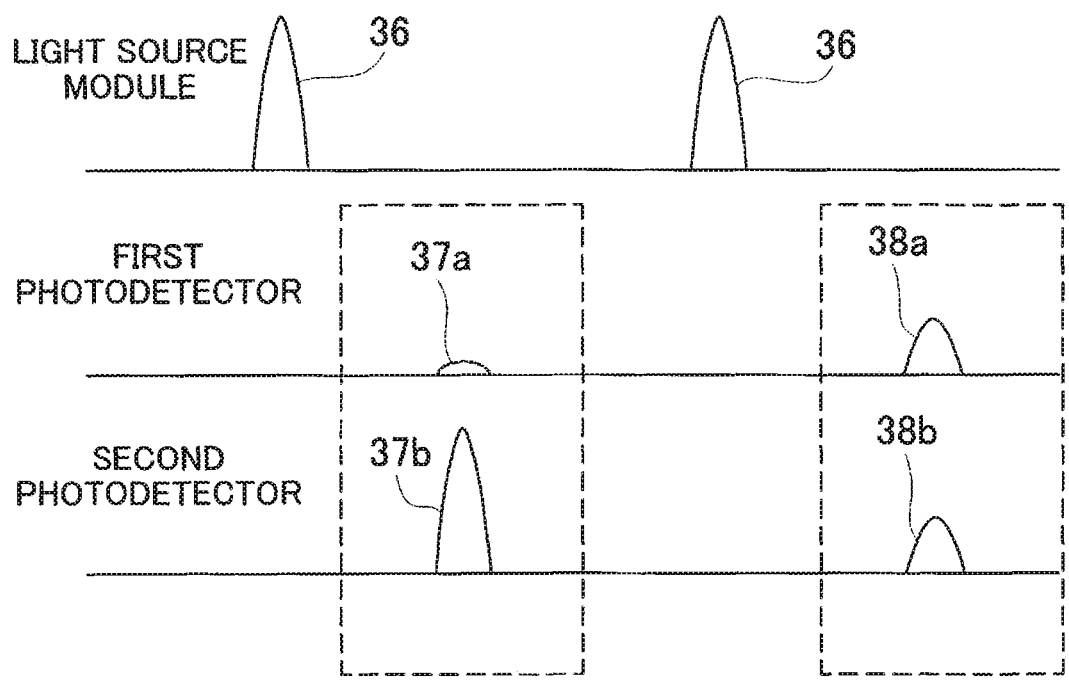
FIG. 3B is an explanatory drawing to explain a relationship between light amounts of a light source module and photodetectors.

Next, a description will be given on a second embodiment of the present invention in FIG. 3A and FIG. 3B. It is to be noted that, in FIG. 3A and FIG. 3B, the equivalent components as shown in FIG. 2A and FIG. 2B are referred by the same symbols, and a description thereof will be omitted.

In a distance measuring module 21 of the second embodiment, a quarter-wave plate 39 which gives a phase difference of $\lambda/4$ is provided, at a position closer to an object to be measured rather than a beam splitter 34 of a light receiving optical axis 26, that is, on a common optical path of a distance measuring light and a reflected distance measuring light. It is to be noted that the quarter-wave plate 39 has optical characteristics which give the phase difference of $\lambda/4$ with respect to a polarization plane. Any other structures are the same as the structures in the first embodiment.

A distance measuring light, which is a pulsed light or a burst-emitted light as a P-polarized light projected from a light source module 24, is transmitted through a projecting lens 32 and then sequentially reflected by a mirror 33 and the beam splitter 34. The distance measuring light reflected by the beam splitter 34 is transmitted through the quarter-wave plate 39. In a process of being transmitted through the quarter-wave plate 39, the phase difference of $\lambda/4$ is given to the polarization plane, and the distance measuring light becomes a circularly-polarized distance measuring light.

The distance measuring light is irradiated to the object to be measured via a scanning mirror 16 (see FIG. 1). A reflected distance measuring light reflected by the object to be measured again enters the quarter-wave plate 39 via the scanning mirror 16. In a case where the object to be measured is made of a metal, the polarization is kept. Therefore, in a process of being transmitted through the quarter-wave plate 39, the reflected distance measuring light which is a circularly-polarized light becomes a reflected distance measuring light which is the S-polarized light, is sequentially transmitted through the beam splitter 34 and the photodetecting lens 35 and enters a photodetection polarizing beam splitter 28.

In the reflected distance measuring light which enters the photodetection polarizing beam splitter 28, the P-polarized light is transmitted through the photodetection polarizing beam splitter 28 and received by a first photodetector 27. In the reflected distance measuring light which enters the photodetection polarizing beam splitter 28, the S-polarized light is reflected by the photodetection polarizing beam splitter 28 and received by a second photodetector 31.

In the second embodiment, the polarization of the distance measuring light and the reflected distance measuring light is changed by the quarter-wave plate 39. Therefore, as shown in FIG. 3B, in a case where the object to be measured is made of a metal, a light receiving amount 37*a* of the first photodetector 27 and a light receiving amount 37*b* of the second photodetector 31 are detected in such a manner that the light receiving amount 37*b* is higher than the light receiving amount 37*a*. On the other hand, in a case where the object to be measured is made of a non-metal, a light receiving amount 38*a* of the first photodetector 27 and a light receiving amount 38*b* of the second photodetector 31 are detected substantially equivalently to each other.

Therefore, an arithmetic control module 18 can determine a material of the object to be measured, that is, whether the object to be measured is made of a metal or a non-metal, based on a comparison between the light amounts and a light amount ratio of the P-polarized light and the S-polarized light in the distance measuring light and the light amounts and a light amount ratio of the P-polarized light and the S-polarized light in the reflected distance measuring light.

Further, the arithmetic control module 18 can acquire three-dimensional point cloud data (positional information) of the object to be measured in which a material information is given for each point based on a distance measurement result and an angle measurement result.

Figure 4A:
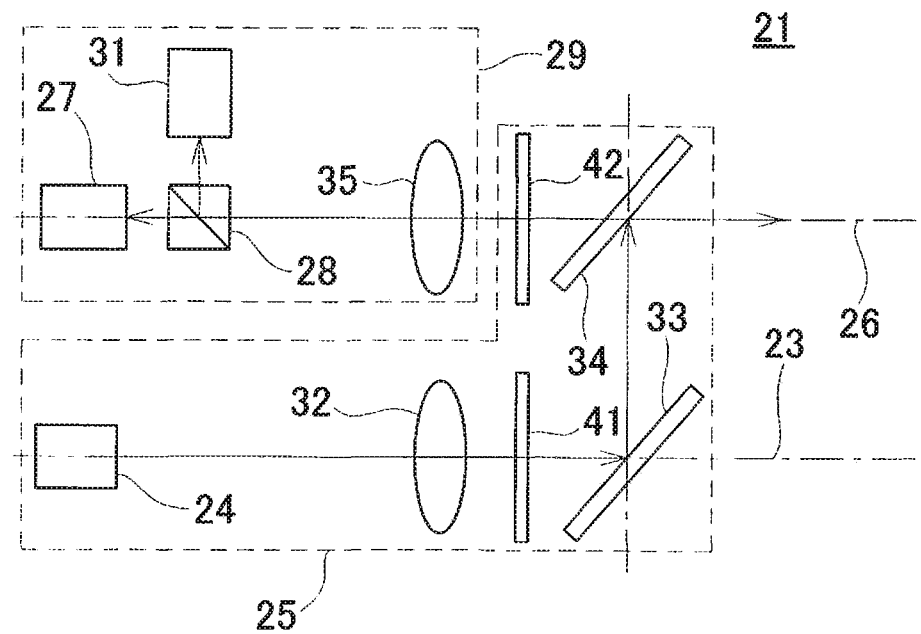
FIG. 4A is a schematical block diagram to show an optical system of a distance measuring module according to a third embodiment.

Next, a description will be given on a third embodiment of the present invention in FIG. 4A and FIG. 4B. It is to be noted that, in FIG. 4A and FIG. 4B, the equivalent components as shown in FIG. 2A and FIG. 2B are referred by the same symbols, and a description thereof will be omitted.

In a distance measuring module 21 of the third embodiment, a projecting quarter-wave plate 41 is provided on a projection optical axis 23 between a projecting lens 32 and a mirror 33, and a photodetecting quarter-wave plate 42 is provide on a light receiving optical axis 26 between a photodetecting lens 35 and a beam splitter 34. Each of the projecting quarter-wave plate 41 and the photodetecting quarter-wave plate 42 has optical characteristics which give a phase difference of $\lambda/4$ with respect to the polarization plane. Any other structures are the same as the structures in the first embodiment.

The distance measuring light, which is a pulsed light or a burst-emitted light as a P-polarized light projected from a light source module 24, is transmitted through the projecting lens 32 and then enters the projecting quarter-wave plate 41. In a process of being transmitted through the projecting quarter-wave plate 41, the phase difference of $\lambda/4$ is given with respect to the polarization plane, and a distance measuring light becomes a distance measuring light which is a circularly-polarized light.

Then, the distance measuring light is sequentially reflected by the mirror 33 and the beam splitter 34 and is irradiated to an object to be measured via a scanning mirror 16 (see FIG. 1). A reflected distance measuring light, which is a circularly-polarized light reflected by the object to be measured, is transmitted through the beam splitter 34 via the scanning mirror 16 and enters the photodetecting quarter-wave plate 42. In a case where the object to be measured is made of a metal, the polarization is kept. Therefore, in a process of being transmitted through the photodetecting quarter-wave plate 42, the reflected distance measuring light which is the circularly-polarized light becomes a reflected distance measuring light which is an S-polarized light and enters a photodetection polarizing beam splitter 28 through the photodetecting lens 35.

In the reflected distance measuring light which enters the photodetection polarizing beam splitter 28, a P-polarized light is transmitted through the photodetection polarizing beam splitter 28 and received by a first photodetector 27. In the reflected distance measuring light which enters the photodetection polarizing beam splitter 28, the S-polarized light is reflected by the photodetection polarizing beam splitter 28 and received by a second photodetector 31.

Figure 4B:
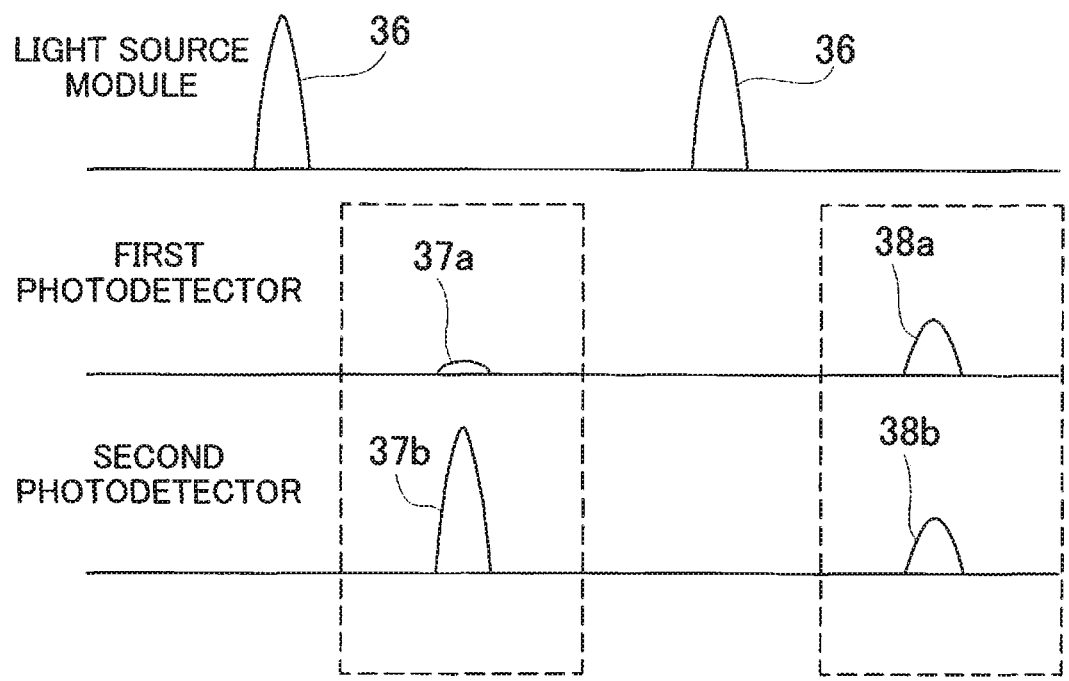
FIG. 4B is an explanatory drawing to explain a relationship between light amounts of a light source module and photodetectors.

In the third embodiment, as shown in FIG. 4B, in a case where the object to be measured is made of a metal, a light receiving amount 37*a* of the first photodetector 27 and a light receiving amount 37*b* of the second photodetector 31 are likewise detected in such a manner that the light receiving amount 37b is higher than the light receiving amount 37a. On the other hand, in a case where the object to be measured is made of a non-metal, a light receiving amount 38a of the first photodetector 27 and a light receiving amount 38b of the second photodetector 31 are detected substantially equivalently to each other.

Therefore, an arithmetic control module 18 can determine a material of the object to be measured, that is, whether the object to be measured is made of a metal or a non-metal, based on a comparison between the light amounts and a light amount ratio of the P-polarized light and the S-polarized light in the distance measuring light and the light amounts and a light amount ratio of the P-polarized light and the S-polarized light in the reflected distance measuring light. Further, the arithmetic control module 18 can acquire three-dimensional point cloud data (positional information) of the object to be measured in which a material information is given for each point based on a distance measurement result and an angle measurement result.

Figure 5A:
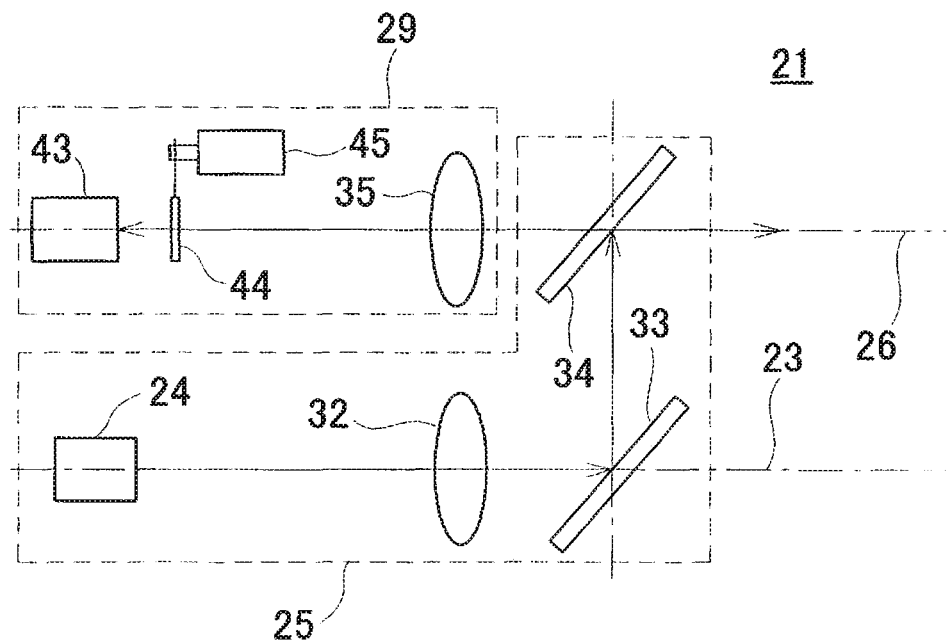
FIG. 5A is a schematical block diagram to show an optical system of a distance measuring module according to a fourth embodiment.

Next, a description will be given on a fourth embodiment according to the present invention in FIG. 5A and FIG. 5B. It is to be noted that, in FIG. 5A and FIG. 5B, the equivalent components as shown in FIG. 2A and FIG. 2B are referred by the same symbols, and a description thereof will be omitted.

In a distance measuring module 21 of the fourth embodiment, a photodetection polarizing beam splitter 28, a first photodetector 27 and a second photodetector 31 in the first embodiment are omitted. On the other hand, the fourth embodiment has a photodetector 43 provided on a light receiving optical axis 26, a polarizing plate 44 which can be inserted and removed into and from the light receiving optical axis 26 and has optical characteristics through which transmit only a P-polarized light, and a polarizing plate driving module 45 which inserts and removes the polarizing plate 44. The polarizing plate 44 and the polarizing plate driving module 45 constitute a polarization selecting module. Any other structures are the same as the structures in the first embodiment.

Figure 5B:
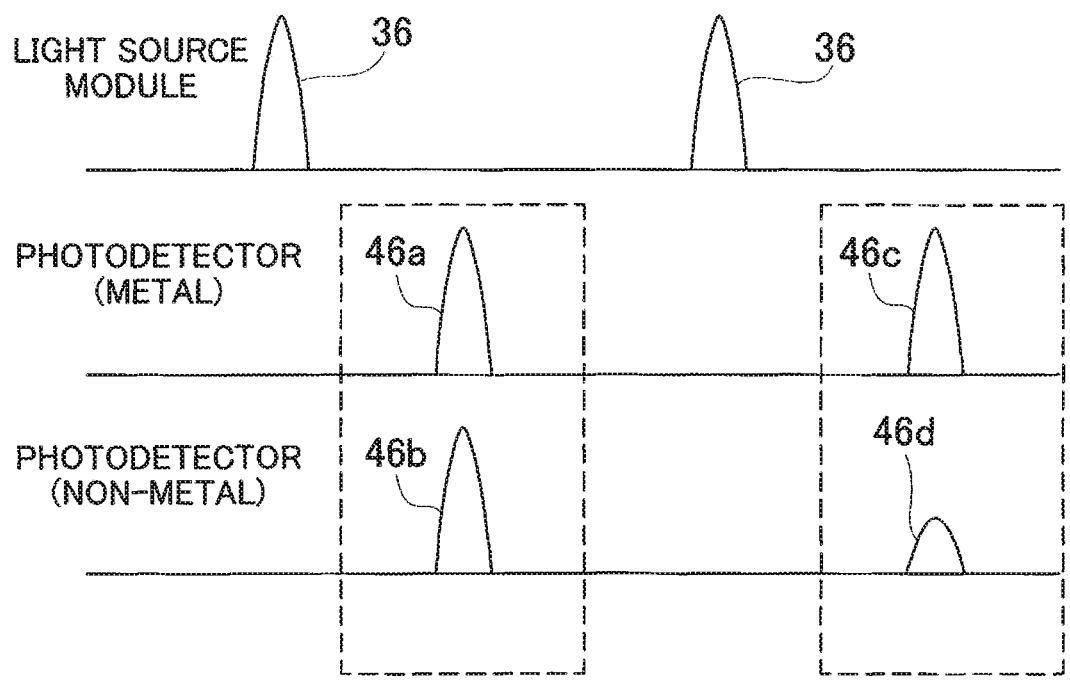
FIG. 5B is an explanatory drawing to explain a relationship between light amounts of a light source module and a photodetector.

In FIG. 5B, a reference sign 46a denotes a light receiving amount received by the photodetector 43 of a case where an object to be measured is made of a metal and the polarizing plate 44 does not exist on the light receiving optical axis 26. Further, a reference sign 46b denotes a light receiving amount received by the photodetector 43 of a case where the object to be measured is made of a non-metal and the polarizing plate 44 does not exist on the light receiving optical axis 26. Further, a reference sign 46c denotes a light receiving amount received by the photodetector 43 of a case where the object to be measured is made of a metal and the polarizing plate 44 is arranged on the light receiving optical axis 26. Further, a reference sign 46d denotes a light receiving amount received by the photodetector 43 of a case where the object to be measured is made of a non-metal and the polarizing plate 44 is arranged on the light receiving optical axis 26.

In a case where the polarizing plate 44 does not exist on the light receiving optical axis 26, no matter what the object to be measured is made of a metal or a non-metal, the light receiving amounts 46a and 46b are detected each of which light amount is substantially equal to a light amount of when a projection light amount 36 is attenuated with a distance to the object to be measured and a reflectivity of the object to be measured. Therefore, in this case, it is impossible to determine whether the object to be measured is made of a metal or a non-metal.

However, in the above-described case, a total light amount of a reflected distance measuring light is not reduced by the polarizing plate 44. Therefore, a light amount which is sufficient to perform a measurement of the object to be measured can be ensured, and point cloud data of the object to be measured can be highly accurately acquired.

Further, in a case where the polarizing plate 44 is arranged on the light receiving optical axis 26, in a process which the reflected distance measuring light is transmitted through the polarizing plate 44, an S-polarized light is eliminated from the reflected distance measuring light. For this reason, in a case where the object to be measured is made of a metal, the reflected distance measuring light becomes a P-polarized light which substantially includes no S-polarized light, and the light receiving amount 46c is detected of which light amount is substantially equal to a light amount of when the projection light amount 36 is attenuated with the distance to object to be measured and the reflectivity of the object to be measured. On the other hand, in a case where the object to be measured is made of a non-metal, since the reflected distance measuring light becomes a light which includes substantially the same amounts of the P-polarized light and the S-polarized light, the light receiving amount 46d is detected of which light amount is substantially a half of the light amount of when the projection light amount 36 is attenuated with the distance to the object to be measured and the reflectivity of the object to be measured.

In the fourth embodiment, point cloud data of the object to be measured is acquired in a state where the polarizing plate 44 is not arranged on the light receiving optical axis 26, and the point cloud data of the object to be measured is again acquired in a state where the polarizing plate 44 is arranged on the light receiving optical axis 26. Then, the arithmetic control module 18 is made to compare two light receiving amounts for each point and to determine whether the object to be measured is made of a metal or a non-metal. A determination result (material information) is given for each point by the arithmetic control module 18.

Figure 6A:
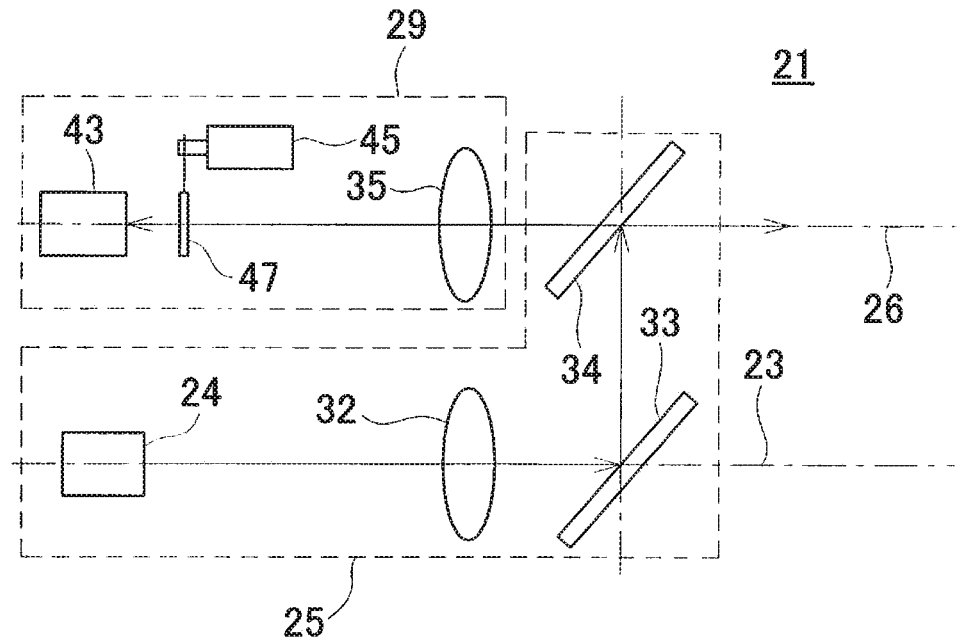
FIG. 6A is a schematical block diagram to show an optical system of a distance measuring module according to a fifth embodiment.

Next, a description will be given on a fifth embodiment of the present invention in FIG. 6A and FIG. 6B. It is to be noted that, in FIG. 6A and FIG. 6B, the equivalent components as shown in FIG. 5A and FIG. 5B are referred by the same symbols, and a description thereof will be omitted.

In a distance measuring module 21 of the fifth embodiment, a polarizing plate 44 in the fourth embodiment is replaced with a polarizing plate 47 through which transmits only an S-polarized light. Therefore, the polarizing plate 47 and a polarizing plate driving module 45 constitute a polarization selecting module. Any other structures are the same as the structures in the fourth embodiment.

Figure 6B:
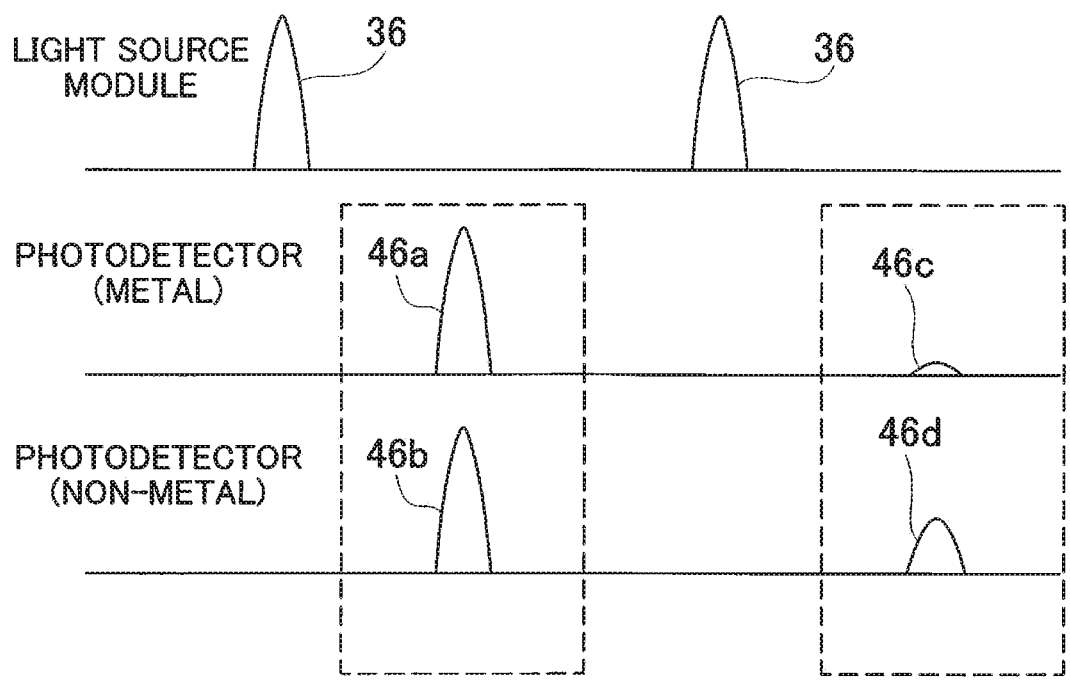
FIG. 6B is an explanatory drawing to explain a relationship between light amounts of a light source module and a photodetector.

In a case where an object to be measured is made of a metal, as shown in FIG. 6B, when the polarizing plate 47 is arranged on a light receiving optical axis 26, a P-polarized light is eliminated from a reflected distance measuring light, and a light receiving amount 46c detected by a photodetector 43 becomes substantially 0.

On the other hand, in a case where the object to be measured is made of a non-metal, when the polarizing plate 47 is arranged on the light receiving optical axis 26, the P-polarized light is eliminated from the reflected distance measuring light, and a light receiving amount 46d detected by the photodetector 43 becomes substantially a half of a light amount of when a projection light amount 36 is attenuated with a distance to the object to be measured and a reflectivity of the object to be measured.

In the fifth embodiment, point cloud data of the object to be measured is acquired in a state where the polarizing plate 47 is not arranged on the light receiving optical axis 26, and the point cloud data of the object to be measured is again acquired in a state where the polarizing plate 47 is arranged on the light receiving optical axis 26. Then, the arithmetic control module 18 is made to compare two light receiving amounts for each point and to determine whether the object to be measured is made of a metal or a non-metal. A determination result (material information) is given for each point by the arithmetic control module 18.

It is to be noted that the fourth embodiment may be combined with the fifth embodiment in such a manner that the polarizing plate 44 and the polarizing plate 47 can be selectively inserted and removed into and from the light receiving optical axis 26.

Figure 7A:
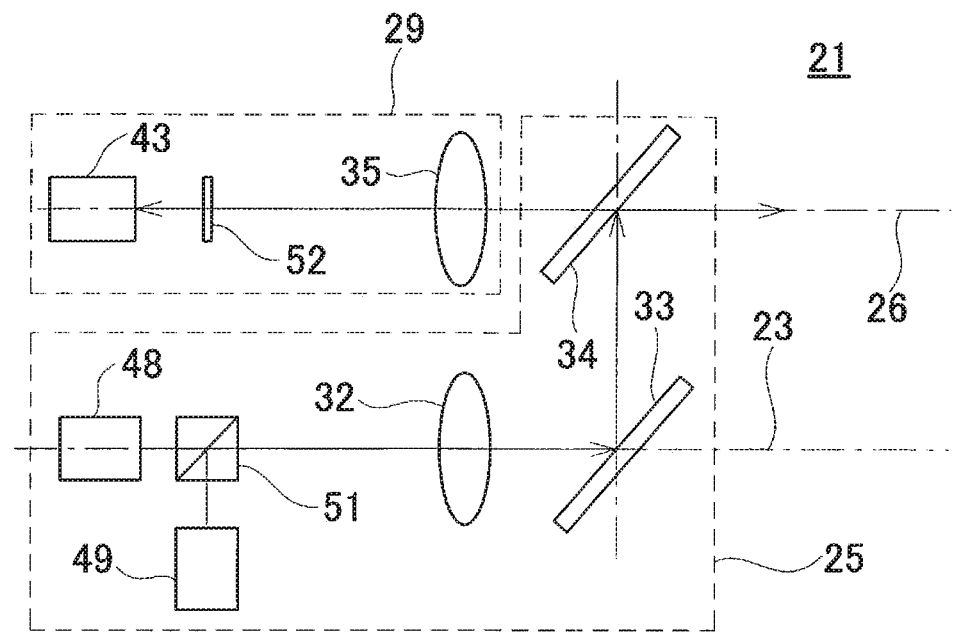
FIG. 7A is a schematical block diagram to show an optical system of a distance measuring module according to a sixth embodiment.
Figure 7B:
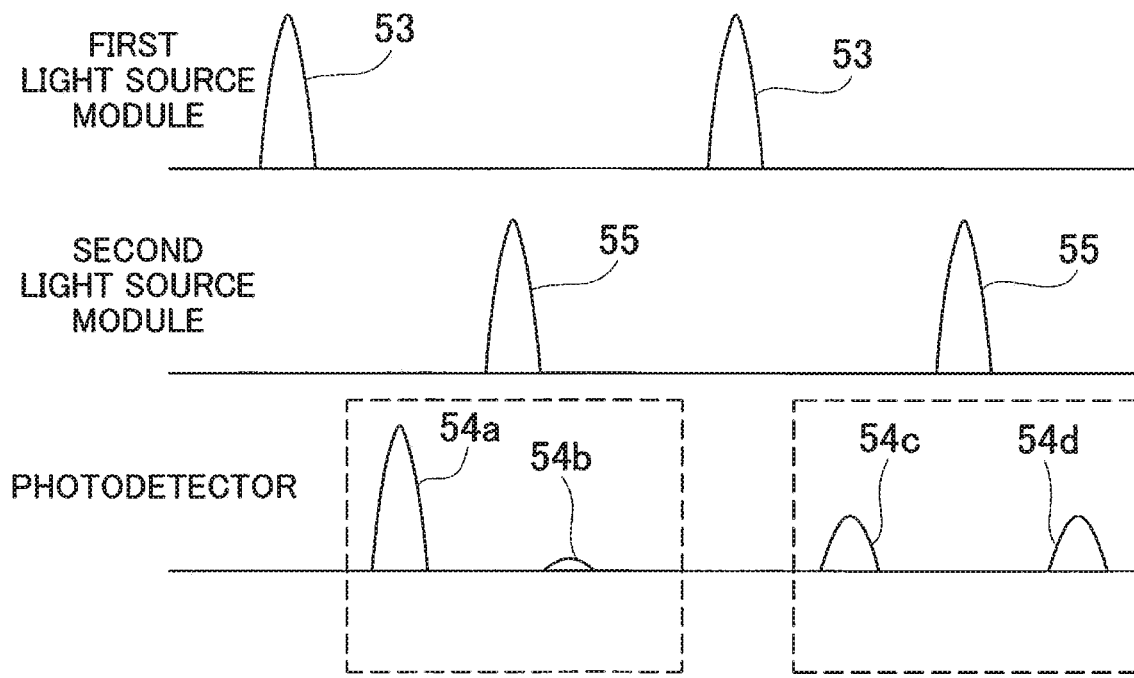
FIG. 7B is an explanatory drawing to explain a relationship between light amounts of light source modules and a photodetector.

Next, a description will be given on a sixth embodiment of the present invention in FIG. 7A and FIG. 7B. It is to be noted that, in FIG. 7A and FIG. 7B, the equivalent components as shown in FIG. 5A and FIG. 5B are referred by the same symbols, and a description thereof will be omitted.

In a distance measuring module 21 of the sixth embodiment, a light source module of a projection optical system 25 is constituted of a first light source module 48 and a second light source module 49. The first light source module 48 is provided on a projection optical axis 23. A projection polarizing beam splitter 51 is provided on the projection optical axis 23, and the second light source module 49 is provided on a reflection optical axis of the projection polarizing beam splitter 51. It is to be noted that the projection optical axis 23 coincides with a transmission optical axis of the projection polarizing beam splitter 51.

The first light source module 48 is configured to project a distance measuring light which is a P-polarized light. Further, the second light source module 49 is configured to project a distance measuring light which is an S-polarized light. Further, the projection polarizing beam splitter 51 has optical characteristics through which transmit the P-polarized light and which reflect the S-polarized light.

Further, a polarizing plate 52 is provided on a light receiving optical axis 26. The polarizing plate 52 has optical characteristics through which transmit the P-polarized light and which intercept the S-polarized light. The projection polarizing beam splitter 51 and the polarizing plate 52 constitute a polarization selecting module.

In the sixth embodiment, the distance measuring light is alternately pulse-emitted or burst-emitted from the first light source module 48 and the second light source module 49. The distance measuring light transmitted through or reflected by the projection polarizing beam splitter 51 is reflected by an object to be measured and received by a photodetector 43 through the polarizing plate 52.

Here, in a case where the object to be measured is made of a metal, the polarization characteristics of the distance measuring light is also kept in the reflected distance measuring light. For this reason, the distance measuring light, which is the P-polarized light projected from the first light source module 48, is transmitted through the polarizing plate 52 as the reflected distance measuring light which is the P-polarized light without reducing its light amount, and is received by the photodetector 43. Therefore, in the photodetector 43, a light receiving amount 54a is detected of which light amount is substantially equal to a light amount of when a projection light amount 53 of the first light source module 48 is attenuated with a distance to the object to be measured and a reflectivity of the object to be measured.

Further, substantially all of the distance measuring light, which is the S-polarized light projected from the second light source module 49, is intercepted by the polarizing plate 52 as the reflected distance measuring light which is the S-polarized light. Therefore, a light receiving amount 54b detected by the photodetector 43 becomes substantially 0.

On the other hand, in a case where the object to be measured is made of a non-metal, the polarization characteristics of the distance measuring light are not kept, and a reflected distance measuring light in which a proportion of the P-polarized light is substantially equal to a proportion of the S-polarized light. For this reason, the distance measuring light, which is the P-polarized light projected from the first light source module 48, has a light receiving amount 54c which is substantially a half of a light amount of when the projection light amount 53 is attenuated with the distance to the object to be measured and the reflectivity of the object to be measured, and is received by the photodetector 43.

Further, the distance measuring light, which is the S-polarized light projected from the second light source module 49, has a light receiving amount 54d which is substantially a half of a light amount of when a projection light amount 55 is attenuated with the distance to the object to be measured and the reflectivity of the object to be measured, and is received by the photodetector 43. That is, both in a case where the distance measuring light is projected from the first light source module 48 and in a case where the distance measuring light is projected from the second light source module 49, the light receiving amounts 54c and 54d detected by the photodetector 43 becomes substantially equal to each other.

In the sixth embodiment, by comparing the light receiving amount with respect to the projection light amount 53 with the light receiving amount with respect to the projection light amount 55, an arithmetic control module 18 can determine whether the object to be measured is made of a metal or a non-metal. A determination result (material information) is given for each point in point cloud data by the arithmetic control module 18.

Figure 8A:
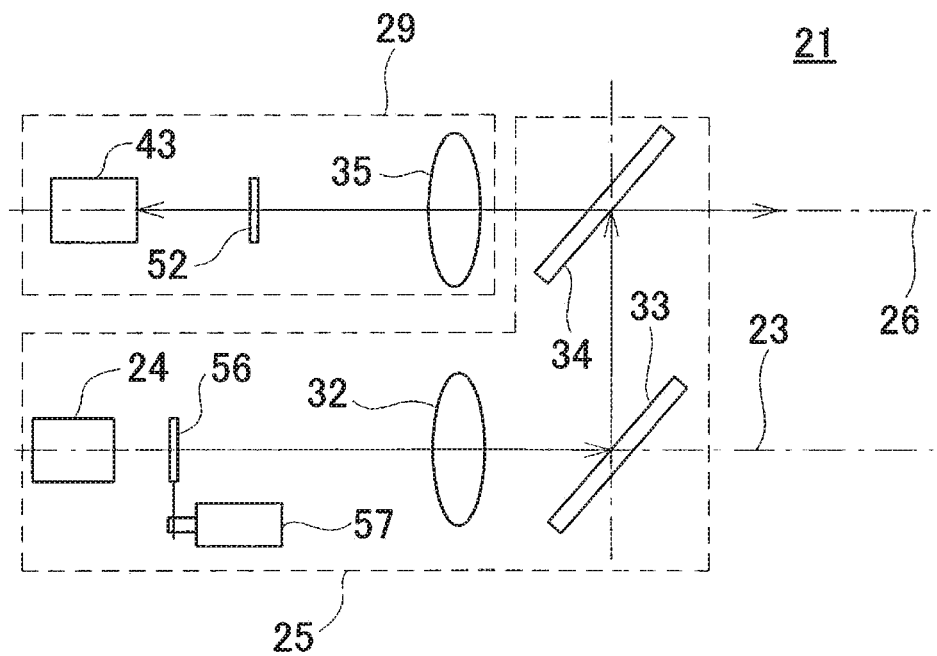
FIG. 8A is a schematical block diagram to show an optical system of a distance measuring module according to a seventh embodiment.

Next, a description will be given on a seventh embodiment of the present invention in FIG. 8A and FIG. 8B. It is to be noted that, in FIG. 8A and FIG. 8B, the equivalent components as shown in FIG. 7A and FIG. 7B are referred by the same symbols, and a description thereof will be omitted.

In a distance measuring module 21 of the seventh embodiment, a projection polarizing beam splitter 51 in the sixth embodiment is omitted, and a light source module is constituted of a single light source module 24. Further, the distance measuring module 21 has a half-wave plate 56, which is insertably and removably provided on a projection optical axis 23 and a wave plate driving module 57, which inserts and removes the half-wave plate 56 into and from the projection optical axis 23. The half-wave plate 56 has optical characteristics to give a phase difference of $\lambda/2$ to a polarization plane of a distance measuring light which is projected from the light source module 24 and to make the distance measuring light which is projected from the light source module 24 a light in a polarizing direction orthogonal to the distance measuring light. The half-wave plate 56, the wave plate driving module 57 and a polarizing plate 52 constitute a polarization selecting module. Any other structures are the same as the structures in the sixth embodiment.

When a distance measuring light which is a P-polarized light is emitted from the light source module 24, a distance measuring light which is the P-polarized light is projected in a case where the half-wave plate 56 does not exist on the projection optical axis 23, and a distance measuring light which is an S-polarized light is projected in a case where the half-wave plate 56 is inserted into the projection optical axis 23.

Figure 8B:
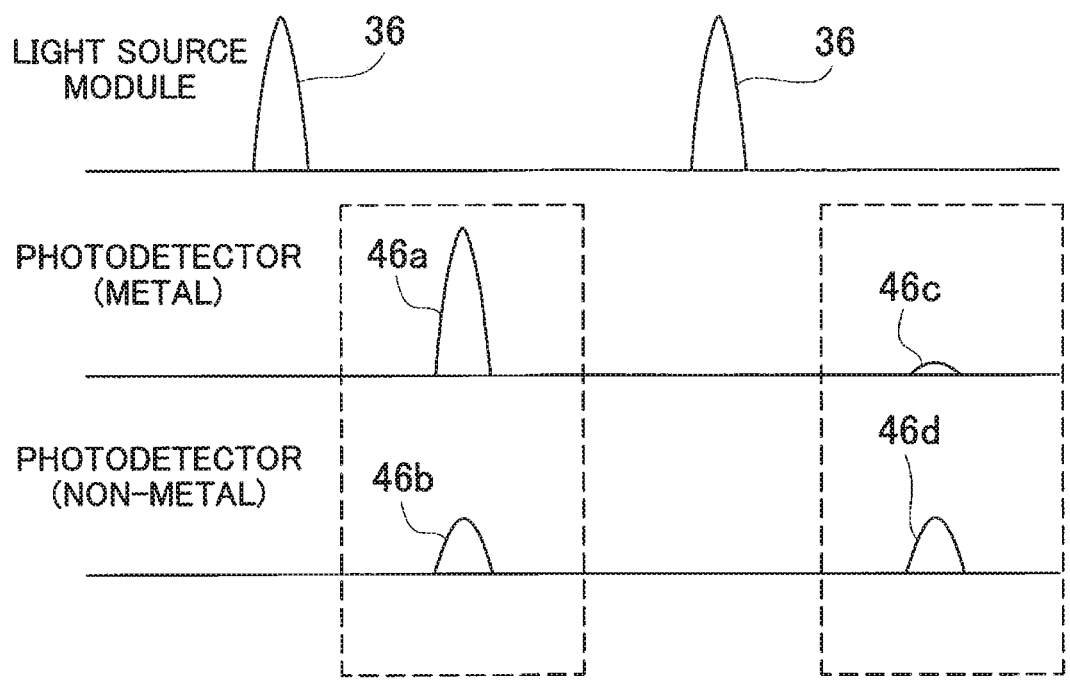
FIG. 8B is an explanatory drawing to explain a relationship between light amounts of a light source module and a photodetector.

In FIG. 8B, a reference sign 46a denotes a light receiving amount of a case where an object to be measured is made of a metal and the half-wave plate 56 does not exist on the projection optical axis 23 (in a case where the distance measuring light is the P-polarized light). Further, a reference sign 46b denotes a light receiving amount of a case where the object to be measured is made of a non-metal and the half-wave plate 56 does not exist on the projection optical axis 23 (in a case where the distance measuring light is the P-polarized light). Further, a reference sign 46c denotes a light receiving amount of a case where the object to be measured is made of a metal and the half-wave plate 56 is arranged on the projection optical axis 23 (in a case where the distance measuring light is the S-polarized light). Further, a reference sign 46d denotes a light receiving amount of a case where the object to be measured is made of a non-metal and the half-wave plate 56 is arranged on the projection optical axis 23 (in a case where the distance measuring light is the S-polarized light).

In a case where the object to be measured is made of a metal and the half-wave plate 56 does not exist on the projection optical axis 23, the P-polarized light is kept as the reflected distance measuring light, a light amount is not reduced by the polarizing plate 52, and the light receiving amount 46a is detected which is substantially equal to a light amount of when a projection light amount 36 is attenuated with a distance to the object to be measured and a reflectivity of the object to be measured. Further, in a case where the object to be measured is made of a non-metal and the half-wave plate 56 does not exist on the projection optical axis 23, the S-polarized light of the reflected distance measuring light, in which the S-polarized light and the P-polarized light coexist, is intercepted by the polarizing plate 52. Therefore, the light receiving amount 46b which is substantially a half of the projection light amount 36 is detected.

Further, in a case where the object to be measured is made of a metal and the half-wave plate 56 is arranged on the projection optical axis 23, the distance measuring light, which becomes the S-polarized light, by the half-wave plate 56 is projected, and substantially all of the reflected distance measuring light, in which the S-polarized light is kept, is intercepted by the polarizing plate 52. Therefore, the light receiving amount 46c detected by the photodetector 43 becomes substantially 0. Further, in a case where the object to be measured is made of a non-metal and the half-wave plate 56 is arranged on the projection optical axis 23, the distance measuring light which is the S-polarized light is projected. The S-polarized light of the reflected distance measuring light, in which the S-polarized light and the P-polarized light coexist, is intercepted by the polarizing plate 52, and the light receiving amount 46d is detected which is substantially a half of a light amount of when the projection light amount 36 is attenuated with the distance to the object to be measured and the reflectivity of the object to be measured.

In the seventh embodiment, at the time of performing a measurement of the object to be measured, point cloud data of the object to be measured is first acquired in a state where the half-wave plate 56 does not exist on the projection optical axis 23. Next, in a state where the half-wave plate 56 is arranged on the projection optical axis 23, the point cloud data of the object to be measured is acquired.

Each measuring point of the acquired two point cloud data have substantially the same coordinates. In a case where the measuring points positioned at the same coordinates are compared with each other, when the object to be measured is made of a metal, different light receiving amounts are detected. On the other hand, when the object to be measured is made of a non-metal, substantially the same light receiving amounts are detected.

Therefore, in the seventh embodiment, by comparing the light receiving amounts of each measuring point in the acquired two point cloud data, an arithmetic control module 18 can determine whether the object to be measured is made of a metal or a non-metal.

It is to be noted that, in the present invention, although a quarter-wave plate 39 or a projecting quarter-wave plate 41 and a photodetecting quarter-wave plate 42 are provided in the second embodiment and the third embodiment, it is needless to say that the quarter-wave plate 39 or the projecting quarter-wave plate 41 and the photodetecting quarter-wave plate 42 may be likewise applied to the fourth embodiment to the seventh embodiment.

The invention claimed is:

1. A surveying instrument comprising: a projection optical system for irradiating a distance measuring light which is a linearly-polarized light to an object to be measured, a light receiving optical system for receiving a reflected distance measuring light from said object to be measured, a polarization selecting module for selecting a polarization of said reflected distance measuring light received by said light receiving optical system, a frame unit which horizontally rotates around a horizontal rotation shaft by a horizontal rotation motor, a scanning mirror which is provided in said frame unit, vertically rotates around a vertical rotation shaft by a vertical rotation motor, irradiates said distance measuring light from said projection optical system to said object to be measured and makes said reflected distance measuring light from said object to be measured enter said light receiving optical system, a horizontal angle detecting module for detecting a horizontal angle of said frame unit, a vertical angle detecting module for detecting a vertical angle of said scanning mirror and an arithmetic control module for controlling a distance measurement, a rotation of said frame unit and a rotation of said scanning mirror based on a light receiving result of said reflected distance measuring light, wherein said arithmetic control module is configured to give a material information to a distance measurement result of said object to be measured based on a change in light receiving amounts caused due to a selection of the polarization by said polarization selecting module.

2. The surveying instrument according to claim 1, wherein said polarization selecting module is a polarizing beam splitter for dividing said reflected distance measuring light into a P-polarized light and an S-polarized light, said light receiving optical system comprises a first photodetector provided on a transmission optical axis of said polarizing beam splitter and a second photodetector provided on a reflection optical axis of said polarizing beam splitter, and said arithmetic control module compares a light receiving amount detected by said first photodetector with a light receiving amount detected by said second photodetector.

3. The surveying instrument according to claim 2, further comprising a quarter-wave plate provided on a common optical path of said distance measuring light and said reflected distance measuring light.

4. The surveying instrument according to claim 2, further comprising quarter-wave plates provided on an optical axis of said distance measuring light and an optical axis of said reflected distance measuring light, respectively.

5. The surveying instrument according to claim 1, wherein said polarization selecting module is constituted of a polarizing plate insertably and removably provided on an optical axis of said reflected distance measuring light and a polarizing plate driving module which inserts and removes said polarizing plate, and said arithmetic control module compares a light receiving amount of said reflected distance measuring light transmitted through said polarizing plate and received by said light receiving optical system with a light receiving amount of said reflected distance measuring light received by said light receiving optical system without being transmitted through said polarizing plate.

6. The surveying instrument according to claim 5, wherein said polarizing plate has optical characteristics through which transmit only a linearly-polarized light which is equal to said distance measuring light.

7. The surveying instrument according to claim 5, wherein said polarizing plate has optical characteristics through which transmit only a linearly-polarized light which is orthogonal to said distance measuring light.

8. The surveying instrument according to claim 1, wherein said polarization selecting module is a polarizing beam splitter for dividing said distance measuring light into a P-polarized light and an S-polarized light, said projection optical system is constituted of a first light source module, which is provided on a transmission optical axis of said polarizing beam splitter and projects said distance measuring light which is said linearly-polarized light, a second light source module, which is provided on a reflection optical axis of said polarizing beam splitter and projects a distance measuring light which is a linearly-polarized light orthogonal to said linearly-polarized light and a polarizing plate provided on an optical axis of said reflected distance measuring light, and said arithmetic control module makes said first light source module and said second light source module project said distance measuring lights and compares light receiving amounts of each of said distance measuring lights detected by said light receiving optical system.

9. The surveying instrument according to claim 1, wherein said polarization selecting module is constituted of a half-wave plate insertably and removably provided on an optical axis of said distance measuring light, a wave plate driving module which inserts and removes said half-wave plate and a polarizing plate provided on an optical axis of said reflected distance measuring light, and said arithmetic control module compares a light receiving amount of said reflected distance measuring light transmitted through said half-wave plate and received by said light receiving optical system with a light receiving amount of said reflected distance measuring light received by said light receiving optical system without being transmitted through said half-wave plate.

10. The surveying instrument according to claim 9, wherein said polarizing plate has optical characteristics through which transmit only a linearly-polarized light which is equal to said distance measuring light.

11. The surveying instrument according to claim 9, wherein said polarizing plate has optical characteristics through which transmit only a linearly-polarized light which is orthogonal to said distance measuring light.

* * * * *